(12) United States Patent
Iwasa

(10) Patent No.: US 12,020,047 B2
(45) Date of Patent: Jun. 25, 2024

(54) VIRTUALIZATION PLATFORM CONTROL DEVICE, VIRTUALIZATION PLATFORM CONTROL METHOD, AND VIRTUALIZATION PLATFORM CONTROL PROGRAM

(71) Applicant: Nippon Telegraph and Telephone Corporation, Tokyo (JP)

(72) Inventor: Eriko Iwasa, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 455 days.

(21) Appl. No.: 17/605,050

(22) PCT Filed: May 17, 2019

(86) PCT No.: PCT/JP2019/019660
§ 371 (c)(1),
(2) Date: Oct. 20, 2021

(87) PCT Pub. No.: WO2020/234917
PCT Pub. Date: Nov. 26, 2020

(65) Prior Publication Data
US 2022/0206829 A1    Jun. 30, 2022

(51) Int. Cl.
*G06F 9/455* (2018.01)
*G06F 9/50* (2006.01)

(52) U.S. Cl.
CPC ............... *G06F 9/455* (2013.01); *G06F 9/50* (2013.01)

(58) Field of Classification Search
CPC ...................................................... G06F 9/455
See application file for complete search history.

(56) References Cited

U.S. PATENT DOCUMENTS

| 8,989,843 | B2 * | 3/2015 | Chien ................. G06T 7/75 600/431 |
| 2007/0250838 | A1 * | 10/2007 | Belady ............... G06F 11/3409 714/E11.197 |
| 2011/0078303 | A1 | 3/2011 | Li et al. |

FOREIGN PATENT DOCUMENTS

| JP | 2013506908 | 2/2013 |
| JP | 2017028563 | 2/2017 |

OTHER PUBLICATIONS kvm.org, "CPU Hotplug," KVM, retrieved on May 8, 2019, retrieved from URL <https://www.linux-kvm.org/page/CPUHotPlug>, 1 pages.

(Continued)

*Primary Examiner* — Charlie Sun
(74) *Attorney, Agent, or Firm* — Fish & Richardson P.C.

(57) ABSTRACT

A virtualization infrastructure control device (10) includes: a monitoring unit (13) for acquiring load information regarding a resource; a scaling control unit (11) for determining, based on the load information, whether or not to perform scaling and calculating a resource amount required for the scaling; and a resource delivery control unit (12) for converting the resource amount required for the scaling to a change number for the number of allocated CPUs regarding a CPU core that is a resource allocated to VM-by-VM, selecting the change number of CPU cores that are to be subjected to the scaling, and transmitting, to a compute, resource change instruction information including information regarding the selected CPU cores whose allocation is to be changed.

12 Claims, 12 Drawing Sheets

(56) References Cited

OTHER PUBLICATIONS openstack.org, "OpenStack Compute (nova)," dated Mar. 26, 2019, retrieved from URL <https://docs.openstack.org/nova/latest/>, 6 pages.

openstack.org, "OpenStack-Heat, Welcome to the Heat documentation," dated Jul. 12, 2018, retrieved from URL <https://docs.openstack.org/heat/latest/>, 4 pages.

\* cited by examiner

Fig. 4

| Compute ID | CORE ID | CPU ALLOCATION LIMITATION SETTING | ALLOCATION DESTINATION |
|---|---|---|---|
| #0 | #0 | YES | VM#01 |
| #0 | #1 | YES | VM#01 |
| #0 | #2 | YES | VM#02 |
| #0 | #3 | YES | VM#02 |
| #0 | #4 | NO | — |
| #0 | #5 | NO | — |
| #0 | #6 | NO | — |
| #0 | #7 | NO | — |
| #1 | #0 | YES | VM#03 |
| #1 | #1 | YES | VM#03 |
| #1 | #2 | NO | — |
| ⋮ | ⋮ | ⋮ | ⋮ |

```
[user@localhost~]$ sudo virsh vcpuinfo vm1
VCPU: 0
CPU: 1
STATUS: IN EXECUTION
CPU TIME: 10s
CPU AFFINITY : yy------

VCPU: 1
CPU: 0
STATUS: IN EXECUTION
CPU TIME: 15s
CPU AFFINITY : yy------
```
} C1

302D

```
[user@localhost~]$ sudo virsh vcpuinfo vm2
VCPU: 0
CPU: 2
STATUS: IN EXECUTION
CPU TIME: 10s
CPU AFFINITY : --yy----

VCPU: 1
CPU: 3
STATUS: IN EXECUTION
CPU TIME: 5s
CPU AFFINITY : --yy----
```
} D1

VIRTUALIZATION PLATFORM CONTROL DEVICE, VIRTUALIZATION PLATFORM CONTROL METHOD, AND VIRTUALIZATION PLATFORM CONTROL PROGRAM

CROSS-REFERENCE TO RELATED APPLICATIONS

This application is a National Stage application under 35 U.S.C. § 371 of International Application No. PCT/JP2019/019660, having an International Filing Date of May 17, 2019. The disclosure of the prior application is considered part of the disclosure of this application, and is incorporated in its entirety into this application.

TECHNICAL FIELD

The present invention relates to a virtualization infrastructure control device, a virtualization infrastructure control method, and a virtualization infrastructure control program for executing scaling processing (resource allocation change) for CPU (Central Processing Unit) resources on a virtualization infrastructure.

BACKGROUND ART

In recent years, virtualization of network functions (NFV: Network Functions Virtualization) that employs virtualization technology has been increasingly employed in communication services. In network virtualization, network functions that has been conventionally realized using dedicated hardware are softwareized and configured to operate on general-purpose servers. It is expected that application of such a network function virtualization technology to carrier networks will make it possible to economically provide both scalability and reliability, promptly provide services, flexibly allocate resources in accordance with demand for each service, and develop services without being restrained by hardware life, for example.

A system that abstracts and encapsulates physical resources such as servers and networks using this virtualization technology and provides common ground to a plurality of applications and services is called a virtualization infrastructure.

For example, VMware vSphere ("VMware vSphere" is a registered trademark) and OpenStack ("OpenStack" is a registered trademark) are known as technologies for realizing virtualization infrastructures. VMware vSphere is one of the existing virtualization infrastructure software products. OpenStack is an open source software group for building cloud environments.

In this OpenStack, OpenStack Nova (see NPL 1) is one of the OpenStack components and is responsible for controlling and managing virtual machines. Nova uses a template called flavor when creating a VM (Virtual Machine). Conditions for allocating resources such as CPUs, memories, and disks are stated in this template.

OpenStack Heat (see NPL 2) is one of the OpenStack components and is responsible for orchestration, namely automation of system construction using a template that defines resource arrangement. If scaling targets and scaling rules are written as AutoScalingGroup and ScalingPolicy in a template, Heat performs scale-out in accordance with these conditions.

On a virtualization infrastructure, allocation of resources to a VM and a cluster (a plurality of VMs) can be flexibly changed in accordance with traffic or the like. For example, there are a scale-out/scale-in method in which processing capacity of a cluster is changed by creating a new VM and adding it to the cluster or deleting a VM from the cluster, and a scale-up/scale-down method in which processing capacity is increased or reduced by changing the resource amount allocated to a VM itself.

In Hotplug (see NPL 3), which is a representative technology for realizing scale-up/scale-down, CPUs, memories, hard disks, or the like to be allocated to a VM can be attached and removed with power of the server on. Accordingly, resources can be flexibly added/deleted by using Hotplug. The Hotplug functionality is also implemented in KVM (Kernel-based Virtual Machine)/QEMU, which is one of the hypervisors for realizing virtualization, and virtual CPUs, memories, and disks of a VM can be added and deleted without stopping the VM.

CITATION LIST

Non Patent Literature

[NPL 1] "OpenStack Compute (nova)," [online], [Searched on May 8, 2019], Internet <URL:https://docs.openstack.org/nova/latest/>

[NPL 2] "OpenStack Heat," [online], [Searched on May 8, 2019], Internet <URL: https://docs.openstack.org/heat/latest/>

[NPL 3] "CPU Hotplug," [online], [Searched on May 8, 2019], Internet <URL: https://www.linux-kvm.org/page/CPUHotPlug>

SUMMARY OF THE INVENTION

Technical Problem

In the case of executing scale-up and scale-down for CPU resources on the above-described virtualization infrastructure using, for example, the Hotplug functionality, allocated resources (vCPU (virtual CPU) etc.) visible from an application side increases or decreases. For this reason, there are cases where an operation (resetting etc.) corresponding to the increased/decreased resources needs to be performed on the application side.

For example, there are cases where, in CPU resources, processing for performing fixed allocation is implemented in which CPUs to be used in a taskset command or the like for an application process are limited based on a set value at the time of startup. In such cases, even if a resource is added at the OS level using Hotplug, the application cannot perform an operation corresponding to the increase in the resources.

In addition, in the case of deleting a CPU resource, if fixed allocation processing in which CPUs to be used are limited has been performed as mentioned above, processing of the application cannot be performed if that CPU is deleted. If a memory that is in use is deleted, processing for making the memory compact (cleaning up the area that is in use) to secure an area that can be freed is required before the deletion, and if an area is deleted without it, data that is in use is lost and processing of the application cannot be performed. Accordingly, in the case of deleting a CPU resource, preprocessing for preventing inconvenience from being caused in operations of the application is necessary in some cases.

The present invention has been made in view of the foregoing, and an object of the present invention is to realize scaling (resource allocation change) of CPU resources on a virtualization infrastructure without affecting the application.

Means for Solving the Problem

To solve the above-described problem, the invention according to claim 1 is a virtualization infrastructure control device including: a monitoring unit for monitoring a load of a resource that is executed by a VM (Virtual Machine) installed on a compute, and acquiring the monitored load as load information; a scaling control unit for determining, based on the load information, whether or not to perform scaling to execute a resource allocation change, regarding a resource allocated VM-by-VM, and calculating a resource amount required for the scaling if it is determined to perform the scaling of the VM; and a resource delivery control unit for converting the resource amount required for the scaling to a change number for the number of allocated CPUs regarding a CPU core that is the resource allocated VM-by-VM, selecting the change number of CPU cores that are to be subjected to the scaling, and transmitting, to the compute, resource change instruction information including information regarding the selected CPU cores whose allocation is to be changed.

The invention according to claim 5 is a virtualization infrastructure control method for a virtualization infrastructure control device that executes a change in allocation of a resource to a VM installed on a compute, wherein the virtualization infrastructure control device executes: a step of monitoring a load of a resource that is executed by the VM and acquiring the monitored load as load information; a step of determining, based on the load information, whether or not to perform scaling to execute a resource allocation change, regarding a resource allocated VM-by-VM, and calculating a resource amount required for the scaling if it is determined to perform the scaling of the VM; and a step of converting the resource amount required for the scaling to a change number for the number of allocated CPUs regarding a CPU core that is the resource allocated VM-by-VM, selecting the change number of CPU cores that are to be subjected to the scaling, and transmitting, to the compute, resource change instruction information including information regarding the selected CPU cores whose allocation is to be changed.

With this configuration, the virtualization infrastructure control device can realize scaling of CPU resources on a virtualization infrastructure without affecting the application.

The invention according to claim 2 is the virtualization infrastructure control device according to claim 1, wherein when determining whether or not to perform the scaling of the VM, if the load information exceeds a predetermined first threshold, the scaling control unit determines to execute scale-up, and if the load information falls below a predetermined second threshold, the scaling control unit determines to execute scale-down.

With this configuration, the virtualization infrastructure control device can appropriately determine scale-up or scale-down and execute the scaling.

The invention according to claim 3 is the virtualization infrastructure control device according to claim 1, wherein a ratio of the change number for the number of allocated CPUs to the resource amount required for the scaling is stored as a predetermined conversion ratio in a storage unit, and the resource delivery control unit calculates the change number for the number of allocated CPUs with respect to the resource amount required for the scaling, based on the predetermined conversion ratio.

With this configuration, the virtualization infrastructure control device can simply calculate the change number for the number of allocated CPUs with respect to the resource amount required for the scaling, using the predetermined conversion ratio.

The invention according to claim 4 is the virtualization infrastructure control device according to claim 1, wherein the resource delivery control unit uses, as a conversion ratio, a value obtained by dividing a total number of CPU cores allocated to each VM installed on the same compute of the VM that is to be subjected to the scaling by a total number of CPU cores included in the compute, and calculates the change number for the number of allocated CPUs using the conversion ratio and the resource amount required for the scaling.

With this configuration, the virtualization infrastructure control device can calculate the conversion ratio in accordance with status of resources of a VM installed on a compute, and appropriately calculate the change number for the number of allocated CPUs.

The invention according to claim 6 is a virtualization infrastructure control program for causing a computer to function as the virtualization infrastructure control device according to claim 1.

According to this virtualization infrastructure control program, each function of the virtualization infrastructure control device according to claim 1 can be realized using a general computer.

Effects of the Invention

According to the present invention, scaling of CPU resources on a virtualization infrastructure can be realized without affecting the application.

BRIEF DESCRIPTION OF DRAWINGS

FIG. 4 is a diagram showing an example of a data configuration of a resource management table (resource management information) according to the present embodiment.

FIG. 7 is a diagram showing an example of resource allocation to a plurality of VMs that are configured on a compute.

DESCRIPTION OF EMBODIMENTS

Next, a mode (hereinafter referred to as "present embodiment") for carrying out the present embodiment will be described. First, a description will be given of an outline of scaling processing executed in a virtualization infrastructure control system (see FIG. 3) that includes a virtualization infrastructure control device 10 according to the present embodiment. Note that the scaling processing in the present embodiment refers to changing processing performance of a VM (virtual machine) by changing allocation of resources to be used by the VM.

<Outline>

Figure 1:
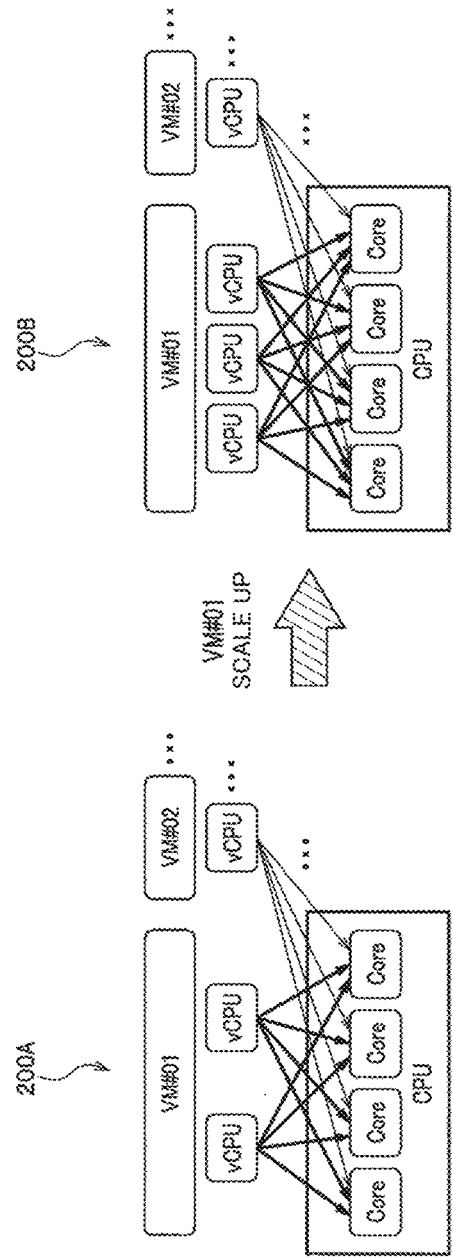
FIG. 1 is a diagram showing an example of scaling processing (scale-up) that has been conventionally performed.
Figure 2:
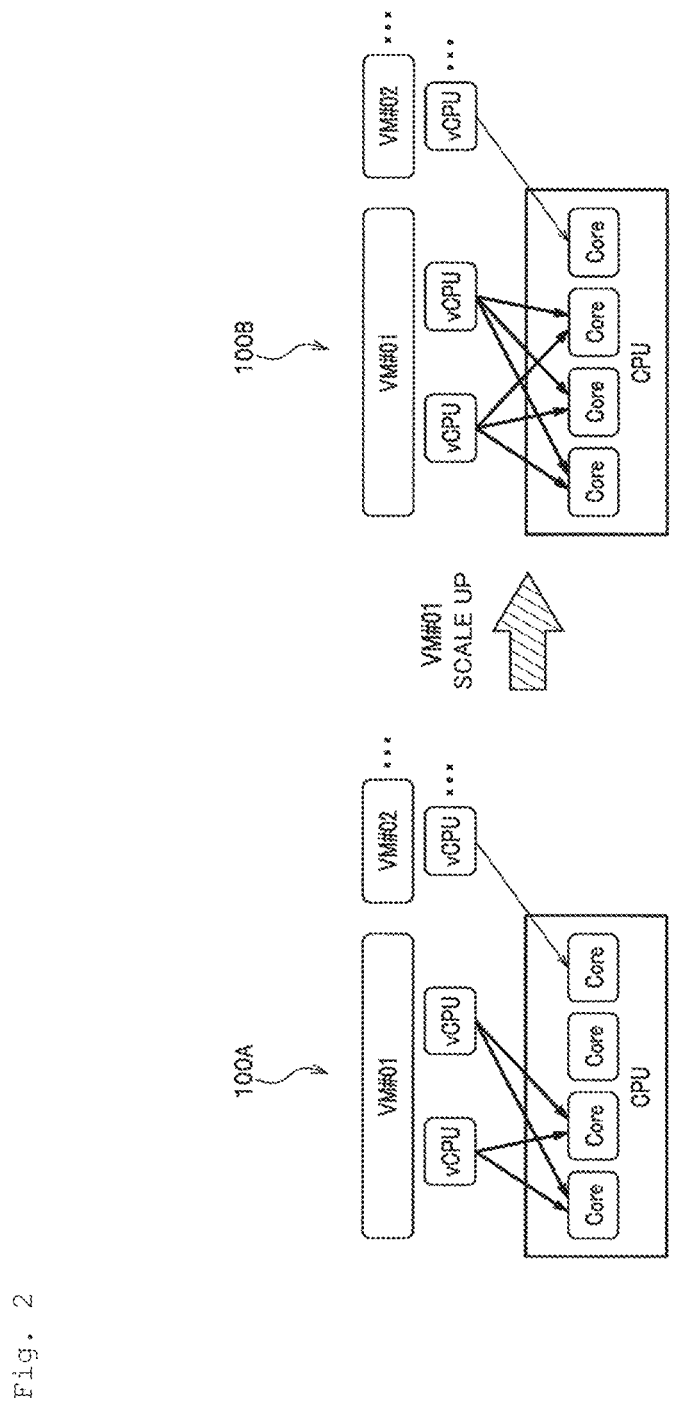
FIG. 2 is a diagram showing an outline of scaling processing (scale-up) that is executed by a virtualization infrastructure control device according to the present embodiment.

FIG. 1 is a diagram showing an example of scaling processing that has been conventionally performed. FIG. 2 is a diagram showing an outline of scaling processing executed by the virtualization infrastructure control device 10 according to the present embodiment.

Conventionally, it is possible that CPU cores of a host (compute) are shared between all VMs installed on the host and also that one VM is occupied by a specific CPU core. FIG. 1 shows an example in which CPU cores (Core) of a host (compute) are shared between VMs installed on the host (reference sign 200A). Here, for example, two vCPUs (virtual CPUs) are set for a VM #01, and the vCPUs share the CPU cores of the host. In the case of scaling up the VM #01 here, the scale-up is realized by increasing vCPUs to be set for the VM #01. FIG. 1 shows an example of adding one vCPU to the VM #01 and scaling up the VM #01 as a VM with three vCPUs (reference sign 200B).

In such a case, if fixed allocation that limits vCPUs has been performed for an application process, an operation such as a resetting is required needs to be performed on the application side.

In contrast, the present embodiment is based on the premise that CPU cores of a host are allocated VM-by-VM. As shown in FIG. 2, for example, two of the CPU cores of the host are allocated to vCPUs of the VM #01 (reference sign 100A). Note that the setting of allocating CPU cores of a host VM-by-VM will be referred to as "CPU allocation limitation setting" below.

In the case of scaling up the VM #01, the virtualization infrastructure control device 10 according to the present embodiment increases the number of CPU cores allocated to each VM, rather than increasing the number of vCPUs as in the conventional technology shown in FIG. 1. That is to say, the number of CPU cores in the CPU allocation limitation setting is changed. In an example denoted by sign 100B in FIG. 2, the number of CPU cores allocated to the vCPUs of the VM #01 is changed from "2" to "3".

That is to say, the virtualization infrastructure control device 10 realizes scale-up/scale-down of CPU resources by changing the number of CPU cores allocated to each VM (hereinafter referred to as "the number of allocated CPUs" in some cases), rather than changing the resource amount (here, the number of vCPUs) visible from the application side. Thus, the virtualization infrastructure control device 10 can perform scale-up/scale-down of CPU resources without changing the resource amount (vCPUs) that is directly visible from the application side as in the case of Hotplug, that is, without affecting the application.

Present Embodiment

Next, a virtualization infrastructure control system 1 that includes the virtualization infrastructure control device 10 will be described.

Figure 3:
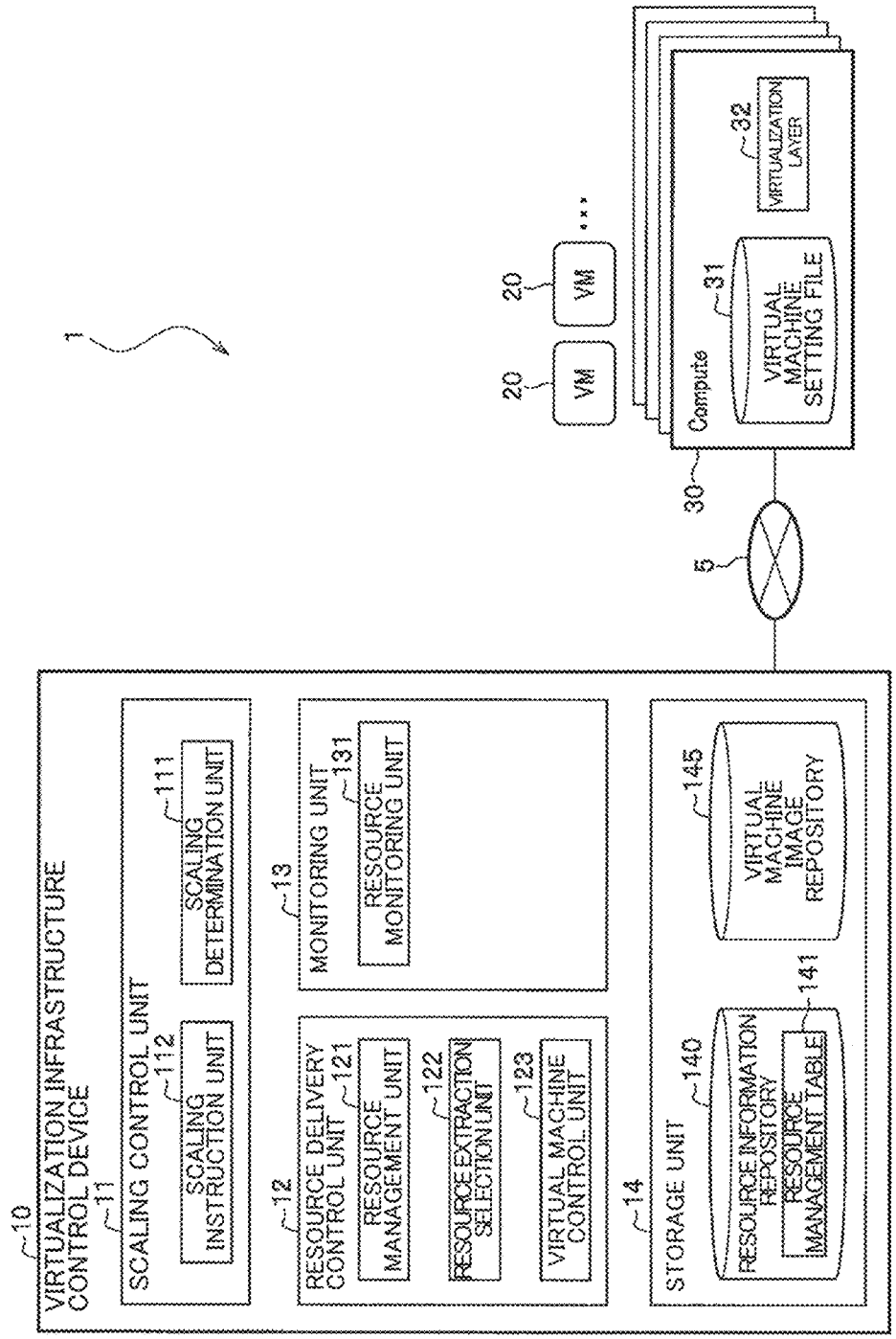
FIG. 3 is a block diagram showing a configuration of a virtualization infrastructure control system that includes the virtualization infrastructure control device according to the present embodiment.

FIG. 3 is a block diagram showing a configuration of the virtualization infrastructure control system 1 that includes the virtualization infrastructure control device 10 according to the present embodiment.

In the virtualization infrastructure control system 1, one or more computes 30 (physical resources: hosts (computers) on which VMs operate) and the virtualization infrastructure control device 10 are communicably connected to each other via a network 5.

One or more VMs 20 can be constructed as virtual environments on the computes 30 based on the control of the virtualization infrastructure control device 10. One or more applications can be arranged (installed) in each VM 20, and provide a service based on a request from a user terminal (not shown in the diagram).

Each of these computes 30 includes a virtual machine setting file 31 and a virtualization layer 32, as shown in FIG. 3. Setting information regarding the VMs 20 including resource allocation information or the like is stored in the virtual machine setting file 31. The virtualization layer 32 generates VMs and controls processing.

The virtualization infrastructure control device 10 is communicably connected to each compute 30 or the like, controls the VMs 20 and allocates resources, as well as performs scaling processing (resource allocation change) on allocated CPU resources.

The virtualization infrastructure control device 10 will be described below in detail.

<<Virtualization Infrastructure Control Device>>

The virtualization infrastructure control device 10 is realized by a computer or the like that includes a control unit, an input/output unit (both not shown in the diagram), and a storage unit 14.

The input/output unit is constituted by a communication interface for transmitting and receiving information, and an input/output interface for transmitting and receiving information between an input device, such as a touch panel or a keyboard, and an output device, such as a monitor.

The storage unit 14 is constituted by a flash memory, a hard disk, a RAM (Random Access Memory), or the like. As shown in FIG. 3, a resource information repository 140 and a virtual machine image repository 145 are stored in the storage unit 14 of the virtualization infrastructure control device 10.

A resource management table 141 (resource management information) that includes information regarding the VMs 20 constructed on the computes 30 (information regarding destinations to which resources are allocated) is stored in the resource information repository 140 (see FIG. 4 etc., which will be described later). VM images, which are templates for starting up virtual instances (VMs) that include installed guest OSes, are stored in the virtual machine image repository 145.

Note that a program (virtualization infrastructure control program) for causing each function of the control unit to be executed and information (later-described threshold information etc.) required for processing of the control unit are stored in the storage unit 14.

Also, the control unit includes a scaling control unit 11, a resource delivery control unit 12, and a monitoring unit 13, as shown in FIG. 3. Note that this control unit also includes other existing functions required to realize a virtualization infrastructure.

The monitoring unit 13 includes a resource monitoring unit 131 that monitors loads of the computes 30 and the VMs 20.

The resource monitoring unit 131 monitors CPU utilization, memory utilization, or the like of the computes 30 and the VMs 20, acquires such information as load information (metrics information), and stores the acquired information in the storage unit 14.

The scaling control unit 11 determines whether or not to execute scaling processing, and gives a scaling instruction if it is determined to execute scaling processing. This scaling control unit 11 includes a scaling determination unit 111 and a scaling instruction unit 112.

The scaling determination unit 111 determines whether or not to execute scaling processing using a predetermined determination rule, based on the load information (metrics information) collected by the monitoring unit 13.

This predetermined determination rule is information that is set, in advance, to the scaling determination unit 111. For example, the load information (CPU utilization, memory utilization etc.) is monitored, and if the load information exceeds a predetermined upper limit threshold (first threshold), the scaling determination unit 111 determines to execute scale-up. If the load information falls below a predetermined lower limit threshold (second threshold), the scaling determination unit 111 determines to execute scale-down. Note that although the following example will give a description while taking an example of only monitoring the CPU utilization as the load information (metric information), the invention is not limited thereto, and execution of scaling processing may be determined using a plurality of pieces of load information (metrics information).

If it is determined to execute scaling processing, the scaling determination unit 111 calculates the resource amount that needs to be added or deleted, based on a predetermined resource amount calculation logic, and outputs the calculated amount to the scaling instruction unit 112. The resource amount to be added or deleted is set, in advance, as a fixed resource amount, for example, in the predetermined resource amount calculation logic. Specifically, in the case of monitoring the CPU utilization, for example, two cores are added if the CPU utilization exceeds 70%, which is the upper limit threshold (first threshold). A setting is made in which, for example, one core is reduced if the CPU utilization falls below 20%, which is the lower limit threshold (second threshold).

In addition to this example, a method may also be used in which a change in the resource amount is predicted using a time-series data estimation mode to determine the amount of scaling.

The scaling instruction unit 112 generates information regarding a VM 20 that is to be scaled up or scaled down, and scaling instruction information that includes the resource amount to be added or deleted, and outputs the generated information to the resource delivery control unit 12.

The resource delivery control unit 12 manages resources and allocates resources to the VMs 20. The resource delivery control unit 12 includes a resource management unit 121, a resource extraction selection unit 122, and a virtual machine control unit 123.

The resource management unit 121 manages resource status in the computes 30 (hosts) using, for example, the resource management table 141 (see FIG. 4) in the resource information repository 140.

FIG. 4 is a diagram showing an example of a data configuration of the resource management table 141 (resource management information) according to the present embodiment.

Information regarding "core ID", "CPU allocation limitation setting", and "allocation destination" is stored in association with "Compute ID", which is identification information regarding the computes 30, in the resource management table 141.

The "core ID" is identification information regarding CPU cores included in each compute 30. For example, eight CPU cores with core IDs "#0" to "#7" are present in a compute 30 with a compute ID "#0", and the compute ID and the core IDs are associated with each other.

The "CPU allocation limitation setting" indicates whether or not a CPU core identified by a core ID is allocated to any of the VMs. "YES" indicates that the CPU core is allocated to any of the VMs. On the other hand, "NO" indicates that the CPU core is not allocated to any of the VMs yet, that is, indicates that the CPU allocation limitation setting is not configured.

Identification information regarding a VM 20 to which a CPU core identified by the core ID is allocated is stored as the "allocation destination". FIG. 4 shows that, on the compute 30 with the compute ID "#0", the CPU cores with the core IDs "#0" and "#1" are allocated to a "VM #01", and the CPU cores with the core IDs "#2" and "#3" are allocated to a "VM #02". Note that if the allocation destination information is "-", it indicates that the corresponding CPU core is not allocated to any of the VMs 20.

Note that the data configuration of the resource management table 141 (resource management information) according to the present embodiment is not limited to the data configuration shown in FIG. 4, and may also include data regarding other resource information. Also, the resource management table 141 may alternatively have a data configuration such as that shown in FIG. 5 (details will be described later).

Returning to FIG. 3, the resource extraction selection unit 122 acquires, from the scaling instruction unit 112, scaling instruction information that includes information regarding a VM 20 to be scaled up or scaled down and the resource amount to be added or deleted. The resource extraction selection unit 122 then converts the number of CPU cores indicated by the acquired resource amount to a change number in the CPU allocation limitation setting (hereinafter referred to as "CPU allocation limitation setting change number").

Note that the CPU allocation limitation setting in the resource management table 141 shown as an example in FIG. 4 is a setting in which two CPU cores are allocated to one VM 20. In the case of scaling up or scaling down, the resource extraction selection unit 122 calculates a value to be added to or deleted from the number of allocated CPUs ("2" in the example in FIG. 4) in this CPU allocation limitation setting. The value to be added or deleted is the aforementioned CPU allocation limitation setting change number. The "CPU allocation limitation setting change number" corresponds to "a change number for the number of allocated CPUs" recited in the claims.

The CPU allocation limitation setting change number is determined based on a conversion ratio 1:α between the resource amount (specifically, the number of CPU cores) to be added or deleted and the CPU allocation limitation setting change number. This conversion ratio α may be such that α=1 and the CPU allocation limitation setting change number is "1" with respect to the resource amount "1" to be added or deleted; that is, the conversion ratio α may be "1:1". Alternatively, the conversion ratio α may be a fixed value other than "1", or may be a variable. An example of calculating the CPU allocation limitation setting change number with the conversion ratio α being a variable will be described with reference to FIG. 12, which will be described later.

In the case of scale-up, the resource extraction selection unit 122, after calculating the CPU allocation limitation setting change number, makes an inquiry about free resources to the resource management unit 121, and selects resources to be allocated. The resource extraction selection unit 122 then updates the resource management table 141 via the resource management unit 121, and outputs an instruction to add resources (scale-up instruction) to the virtual machine control unit 123.

In the case of scale-down, the resource extraction selection unit 122, after calculating the CPU allocation limitation setting change number, makes an inquiry about resources that are in use to the resource management unit 121, and selects resources to be deleted. The resource extraction selection unit 122 then updates the resource management table 141 via the resource management unit 121, and outputs an instruction to delete resources (scale-down instruction) to the virtual machine control unit 123.

Here, a resource allocation method executed by the resource extraction selection unit 122 will be described.

Note that, although an example of using a KVM as a hypervisor will be described here, the invention is not limited thereto.

Figure 6:
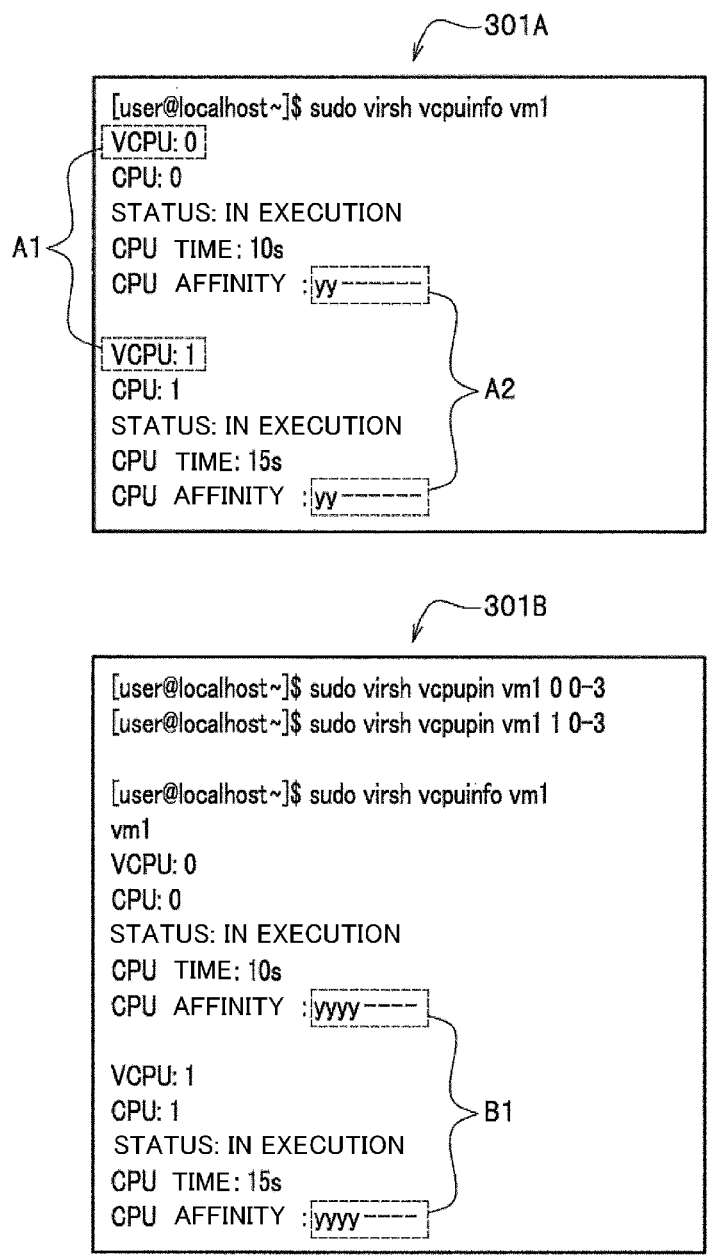
FIG. 6 is a diagram showing settings in an initial state of resource allocation to a VM that are configured on a compute, and an example of performing CPU allocation limitation setting for a CPU core for which the CPU allocation limitation setting has not been configured and allocating the CPU core to the VM.

Reference sign 301A in FIG. 6 denotes a diagram showing settings in an initial state of resource allocation to the VM #01 that is set on a compute 30.

In this example, it is indicated that two vCPUs are set for the VM #01 (vm1) (reference sign A1). It can also be understood from "yy" shown as a "CPU affinity" item that, of eight CPU cores of the current host compute, "#0" and "#1" are allocated to the VM #01 (vm1) (reference sign A2). Here, as for "yy" shown as the CPU affinity, "y" indicates that a corresponding CPU core is allocated, and "-" indicates that it is not allocated, regarding the CPU cores "#0" to "#7" in the order from left. That is to say, it is indicated that, regarding the VM #01, the CPU allocation limitation setting is configured for the CPU cores "#0" and "#1".

A description will be given of an example in which the resource extraction selection unit 122 allocates resources to CPU cores for which the CPU allocation limitation setting is not configured, in the initial state of resource allocation denoted by reference sign 301A.

Reference sign 301B in FIG. 6 denotes a diagram showing an example of configuring the CPU allocation limitation setting for CPU cores for which the CPU allocation limitation setting for the VM #01 that is set on a compute 30 has not been configured, and allocating the CPU cores to this VM.

For example, in the case of KVM, processing of a "virsh vcpupin VM name xx yy" command is executed. Here, "xx" denotes an identification number of a vCPU, and "yy" denotes identification information regarding a CPU core for which the CPU allocation limitation setting is to be configured. In the example denoted by reference sign 301B, it is indicated by "yyyy" shown as the "CPU affinity" item that, regarding two vCPU that are set for the VM #01, a change has been made such that the CPU cores "#0", "#1", "#2", and "#3" are allocated to the VM #01 (reference sign B1).

Figure 5:
FIG. 5 is a diagram showing another example of a data configuration of a resource management table (resource management information) according to the present embodiment.

Subsequently, another example of the resource allocation method executed by the resource extraction selection unit 122 will be described. Note that, here, management in the resource management table 141 is performed compute-by-compute, as shown in FIG. 5. The resource extraction selection unit 122 can extract a CPU core for which the CPU allocation limitation setting is not configured, by checking CPU cores (that are in use) for which the CPU allocation limitation setting is configured at this point, regarding each of the VMs 20 that are installed on the same compute 30. Note that, in the case of KVM, processing of a "virsh vcpuinfo VM name" command is executed.

Reference sign 302C in FIG. 7 denotes a setting state of two vCPUs that are set on the VM #01 (vm1). It is indicated by "yy" shown as the "CPU affinity" item that, of eight CPU cores of the current host compute, "#0" and "#1" are allocated to the VM #01 (reference sign C1).

Reference sign 302D in FIG. 7 denotes a setting state of two vCPUs that are set on the VM #02 (vm2). It is indicated by "--yy" shown as the "CPU affinity" item that, of eight CPU cores of the current host compute, "#2" and "#3" are allocated to the VM #02 (reference sign D1).

Thus, the resource extraction selection unit 122 checks CPU cores for which the CPU allocation limitation setting is configured, regarding each of the VMs 20 installed on the same compute 30.

In this example, the CPU allocation limitation setting is configured for the CPU cores "#0", "#1", "#2", and "#3", and the resource extraction selection unit 122 can extract the other CPU cores "#4", "#5", "#6", and "#7" as CPU cores for which the CPU allocation limitation setting are not configured.

Returning to FIG. 3, the virtual machine control unit 123, upon acquiring an instruction to add resource (scale-up instruction) from the resource extraction selection unit 122, transmits resource change instruction information that is an instruction to add the selected resources (CPU cores) to the CPU allocation limitation setting, to the virtualization layer 32 of the compute 30.

Also, the virtual machine control unit 123, upon acquiring an instruction to delete resources (scale-down instruction) from the resource extraction selection unit 122, transmits resource change instruction information that is an instruction to delete the selected resources (CPU cores) from the CPU allocation limitation setting, to the virtualization layer 32 of the compute 30.

<Processing Flow>

Next, a flow of processing executed by the virtualization infrastructure control device 10 will be described with reference to FIGS. 8 to 12.

<<VM Startup Processing>>

Figure 8:
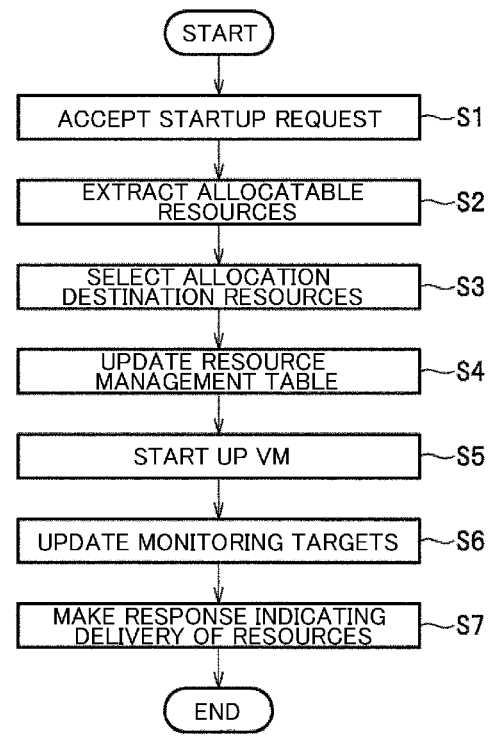
FIG. 8 is a flowchart showing a flow of VM startup processing performed by the virtualization infrastructure control device according to the present embodiment.

FIG. 8 is a flowchart showing a flow of processing for starting up a VM 20 performed by the virtualization infrastructure control device 10 according to the present embodiment.

First, the resource delivery control unit 12 of the virtualization infrastructure control device 10 accepts a request to start up a new VM 20 (step S1).

Then, the resource extraction selection unit 122 of the resource delivery control unit 12 references the resource management table 141 (FIG. 4) in the resource information repository 140 in the storage unit 14, and extracts allocatable resources (CPU cores) (step S2). Then, the resource extraction selection unit 122 selects, from the extracted candidates, resources that are to be allocation destinations in accordance with a predetermined allocation policy (step S3).

Note that the predetermined allocation policy may be set such that resources (CPU cores) are allocated while applying an Affinity rule or an Anti-Affinity rule, or considering the resource amount used by other VMs 20 to which resources are already allocated, for example. Note that, when selecting the resources that are to be allocation destinations, the resource delivery control unit 12 applies the CPU allocation limitation setting and sets the number of CPU cores to be allocated to the VM 20 (the number of allocated CPUs).

After the resources (CPU cores) to which the VM 20 to be started up is allocated are selected in step S3, the resource management unit 121 updates the resource management table 141 (FIG. 4) in the resource information repository 140 (step S4). Specifically, the resource management unit 121 adds the VM ID of the VM 20 to be newly started up to an "allocation destination" column corresponding to the core ID of the selected compute 30 in the resource management table 141. Then, the "CPU allocation limitation setting" item is changed from "NO" to "YES".

Subsequently, the virtual machine control unit 123 references the virtual machine image repository 145 in the storage unit 14, and starts up the new VM 20 using a VM image corresponding to the compute 30 that includes the resources (CPU cores) selected in step S3 (step S5).

When the VM 20 is started up in step S5, a virtual machine setting file 31 is created in the compute 30. Resource allocation information or the like is stated in this virtual machine setting file 31.

Next, the resource monitoring unit 131 adds the newly-started VM 20 and updates monitoring targets (step S6). Then, the resource delivery control unit 12 makes, to a host system or the like (not shown), a response indicating delivery of the resources (step S7), and ends the processing.

<<Scaling Execution Determination Processing>>

Next, scaling execution determination processing performed by the scaling control unit 11 of the virtualization infrastructure control device 10 will be described. Note that the monitoring unit 13 (resource monitoring unit 131) of the virtualization infrastructure control device 10 collects load information such as CPU utilization and memory utilization of the computes 30 and the VMs 20 at predetermined time intervals (e.g., monitoring intervals and stores the collected load information in the storage unit 14. Note that, in the following description, the CPU utilization is collected as the load information (metric information).

Figure 9:
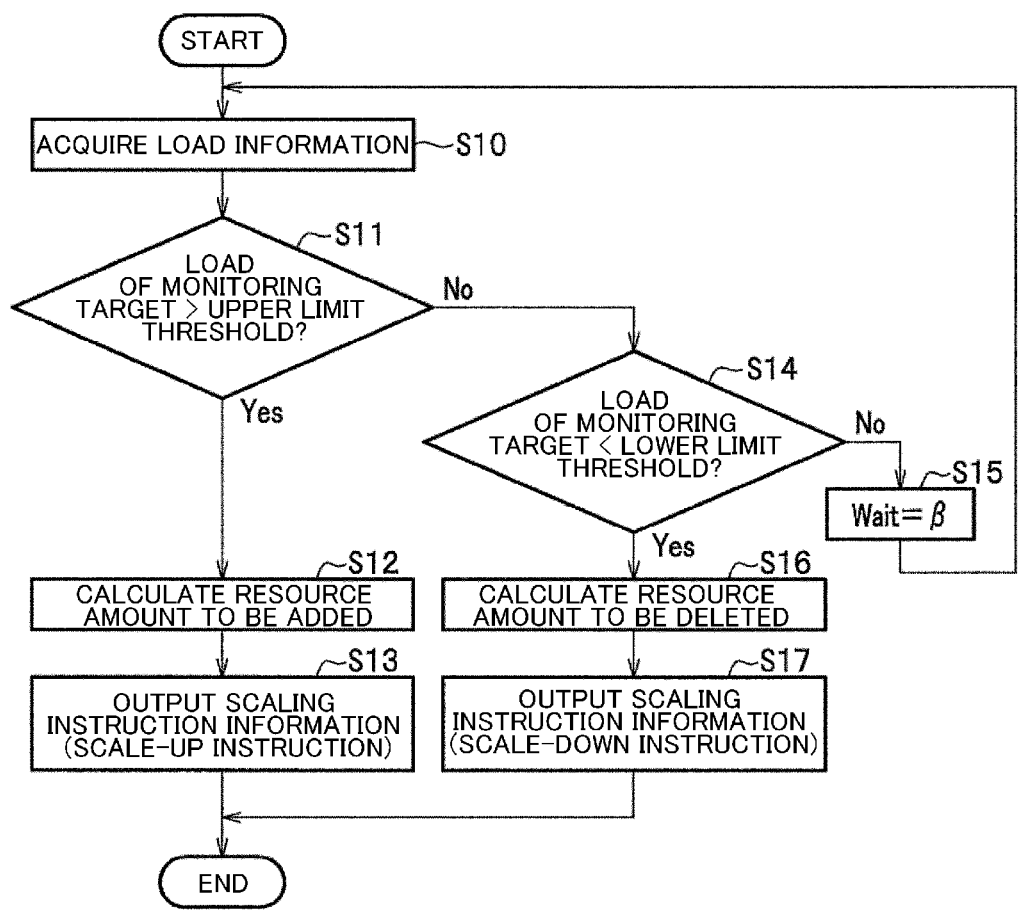
FIG. 9 is a flowchart showing a flow of scaling execution determination processing that is executed by the virtualization infrastructure control device according to the present embodiment.

FIG. 9 is a flowchart showing a flow of scaling execution determination processing executed by the virtualization infrastructure control device 10 according to the present embodiment.

First, the scaling control unit 11 (scaling determination unit 111) of the virtualization infrastructure control device 10 acquires the load information (metric information) such as CPU utilization collected by the resource monitoring unit 131 (step S10).

Subsequently, the scaling determination unit 111 determines, based on the acquired load information, whether or not the load of a monitoring target (here, a VM 20) exceeds a predetermined upper limit threshold (first threshold) (step S11).

Here, if the load of the monitoring target exceeds the predetermined upper limit threshold (first threshold) (step S11→Yes), the processing proceeds to the next step S12.

In step S12, the scaling determination unit 111 calculates the resource amount to be added, based on a predetermined resource amount calculation logic. For example, if "add two cores if the CPU utilization exceeds the upper limit threshold (first threshold), namely 70% (if it is determined to execute scale-up)" is set as the predetermined resource amount calculation logic, the calculated resource amount to be added is "two cores".

Next, the scaling instruction unit 112 outputs, to the resource delivery control unit 12, scaling instruction information (scale-up instruction) that includes information regarding the VM 20 to be scaled up and information regarding the resource amount to be added (e.g., "two cores") (step S13), and ends the processing.

On the other hand, if, in step S11, the scaling determination unit 111 determines that the load of the monitoring target does not exceed the predetermined upper limit threshold (first threshold) (step S11→No), the processing proceeds to step S14.

In step S14, the scaling determination unit 111 determines, based on the load information acquired in step S10, whether or not the load of the monitoring target (here, the VM 20) falls below a predetermined lower limit threshold (second threshold).

Here, if the load of the monitoring target does not fall below the predetermined lower limit threshold (second threshold) (step S14→No), the processing returns to step S10 after waiting for a predetermined time interval (e.g., a monitoring interval β) (step S15) and is continued.

On the other hand, if the load of the monitoring target falls below the predetermined lower limit threshold (second threshold) (step S14→Yes), the processing proceeds to the next step S16.

In step S16, the scaling determination unit 111 calculates the resource amount to be deleted, based on a predetermined resource amount calculation logic. For example, if "delete one core if the CPU utilization falls below the lower limit threshold (second threshold), namely 20% (if it is determined to execute scale-down)" is set as the predetermined resource amount calculation logic, the calculated resource amount to be deleted is "one cores".

Next, the scaling instruction unit 112 outputs, to the resource delivery control unit 12, scaling instruction information (scale-down instruction) that includes information regarding the VM 20 to be scaled down and information regarding the resource amount to be deleted (e.g., "one core") (step S17), and ends the processing.

<<Scaling Processing in Case of Scale-Up>

Next, scaling processing in the case of scale-up performed by the resource delivery control unit 12 of the virtualization infrastructure control device 10 will be described.

Figure 10:
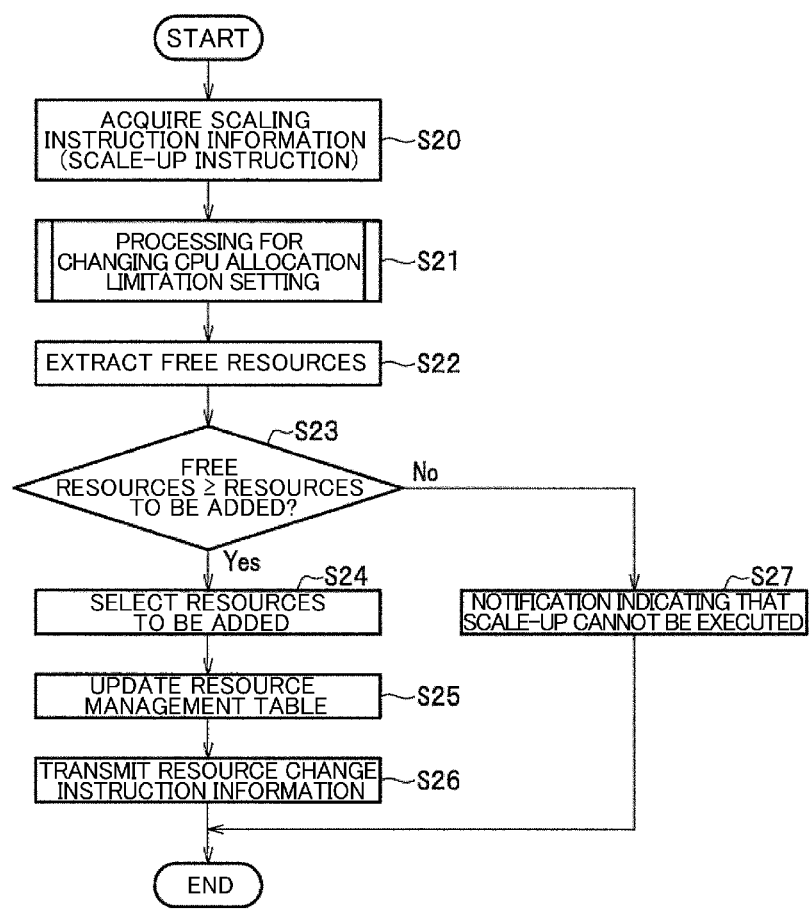
FIG. 10 is a flowchart showing a flow of scaling processing in the case of scale-up executed by the virtualization infrastructure control device according to the present embodiment.

FIG. 10 is a flowchart showing a flow of scaling processing in the case of scale-up executed by the virtualization infrastructure control device 10 according to the present embodiment.

First, the resource delivery control unit 12 (resource extraction selection unit 122) of the virtualization infrastructure control device 10 acquires, from the scaling instruction unit 112, scaling instruction information (scale-up instruction) that includes information regarding the VM 20 to be scaled up and information regarding the resource amount to be added (e.g., "two cores") (step S20).

Next, the resource extraction selection unit 122 converts the number of CPU cores indicated by the acquired resource amount (to be added) to the change number in the CPU allocation limitation setting (CPU allocation limitation setting change number) (step S21: processing for changing the CPU allocation limitation setting). Note that this processing for changing the CPU allocation limitation setting will be described in detail with reference to FIG. 12, which will be described later.

For example, the resource extraction selection unit 122 calculates the CPU allocation limitation setting change number as being "1" from the resource amount to be added (two cores), based on the conversion ratio α. Then, the resource extraction selection unit 122 changes the scaling instruction information (scale-up instruction) to the change number to be added to the CPU allocation limitation setting (CPU allocation limitation setting change number): "1" (+1).

Subsequently, the resource extraction selection unit 122 extracts free resources (CPU cores that are not set) by making, to the resource management unit 121, an inquiry about free resources (here, CPU cores for which the CPU allocation limitation setting is not configured) in the same compute 30 as the VM 20 to be scaled up (step S22).

Next, the resource extraction selection unit 122 determines whether or not the amount of free resource is greater than or equal to the resource amount to be added (step S23). Specifically, the resource extraction selection unit 122 determines whether or not the amount of free resource (the number of CPU cores that are not set) is greater than or equal to the CPU allocation limitation setting change number ("1").

Then, if the amount of free resource is greater than or equal to the CPU allocation limitation setting change number (step S23→Yes), the resource extraction selection unit 122 proceeds to the next step S24.

In step S24, the resource extraction selection unit 122 selects resources (CPU cores) to be added from the free resources. The resource extraction selection unit 122 may randomly determine the selection of resources to be added, or may determine the selection of resources to be added based on a predetermined logic, for example.

Subsequently, the resource management unit 121 updates the resource management table 141 (FIG. 4) in the resource information repository 140 (step S25). Specifically, the resource management unit 121 adds the VM ID of the VM 20 to be scaled up to the "allocation destination" column corresponding to the core ID of the selected compute 30 in the resource management table 141. Then, the "CPU allocation limitation setting" item is changed from "NO" to "YES".

Then, the virtual machine control unit 123 transmits, to the virtualization layer 32 of the compute 30, resource change instruction information that is an instruction to add the resources (CPU cores) selected in step S24 to the CPU allocation limitation setting for the VM 20 to be scaled up (step S26). Thus, the compute 30 is caused to execute scaling processing (scale-up) to add the resources to the VM 20 to be scaled up.

On the other hand, if, in step S23, the amount of free resource is not greater than or equal to the resource amount to be added (step S23→No), that is, if the amount of free resource (the number of CPU cores that are not set) is not greater than or equal to the CPU allocation limitation setting change number, the resource extraction selection unit 122 outputs a notification indicating that scale-up cannot be executed to a host system or the like (not shown) (step S27), and ends the processing.

<<Scaling Processing in Case of Scale-Down>>

Next, a description will be given of scaling processing in the case of scale-down performed by the resource delivery control unit 12 of the virtualization infrastructure control device 10.

Figure 11:
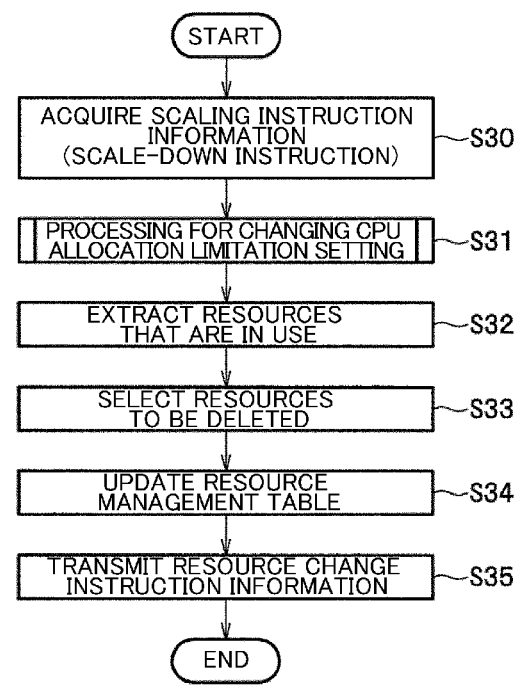
FIG. 11 is a flowchart showing a flow of scaling processing in the case of scale-down executed by the virtualization infrastructure control device according to the present embodiment.

FIG. 11 is a flowchart showing a flow of scaling processing in the case of scale-down executed by the virtualization infrastructure control device 10 according to the present embodiment.

First, the resource delivery control unit 12 (resource extraction selection unit 122) of the virtualization infrastructure control device 10 acquires, from the scaling instruction unit 112, scaling instruction information (scale-down instruction) that includes information regarding the VM 20 to be scaled down and information regarding the resource amount to be deleted (e.g., "one core") (step S30).

Next, the resource extraction selection unit 122 converts the number of CPU cores indicated by the acquired resource amount (to be deleted) to the change number in the CPU allocation limitation setting (CPU allocation limitation setting change number) (step S31: processing for changing to the CPU allocation limitation setting). Note that this processing for changing the CPU allocation limitation setting will be described in detail with reference to FIG. 12, which will be described later.

For example, the resource extraction selection unit 122 calculates the CPU allocation limitation setting change number as being "1" from the resource amount to be deleted (one cores), based on the conversion ratio α. Then, the resource extraction selection unit 122 changes the scaling instruction information (scale-down instruction) to the change number to be deleted from the CPU allocation limitation setting (CPU allocation limitation setting change number): "1" (−1).

Subsequently, the resource extraction selection unit 122 extracts information regarding resources (CPU cores) that are being used by the VM 20 to be scaled down by making, to the resource management unit 121, an inquiry about information regarding CPU cores that are set for this VM 20 (CPU allocation limitation setting) (step S32). Note that the resource management unit 121 can acquire information regarding the CPU cores that are set for the VM 20 to be scaled down, by referencing the resource management table 141 (FIG. 4).

Subsequently, the resource extraction selection unit 122 selects resources (CPU cores) to be deleted from the extracted resources (CPU core) that are in use (step S33). For example, the resource extraction selection unit 122 may randomly determine the selection of resources to be deleted, or may determine the selection of resources to be deleted based on a predetermined logic.

Next, the resource management unit 121 updates the resource management table 141 (FIG. 4) in the resource information repository 140 (step S34). Specifically, the resource management unit 121 deletes the VM ID of the VM 20 to be scaled down that is set in the "allocation destination" column corresponding to the core ID of the selected compute 30 in the resource management table 141. Then, the "CPU allocation limitation setting" item is changed from "YES" to "NO".

Then, the virtual machine control unit 123 transmits, to the virtualization layer 32 of the compute 30, resource change instruction information that is an instruction to delete the resources (CPU cores) selected in step S33 from the CPU allocation limitation setting for the VM 20 to be scaled down (step S35). Thus, the compute 30 is caused to execute scaling processing (scale-down) to delete the resources from the VM 20 to be scaled down.

<<Processing for Changing CPU Allocation Limitation Setting>>

Next, a description will be given of processing for changing the CPU allocation limitation setting performed by the resource extraction selection unit 122 of the virtualization infrastructure control device 10. The resource extraction selection unit 122 converts the number of CPU cores indicated by the resource amount to be added or deleted to the change number in the CPU allocation limitation setting (CPU allocation limitation setting change number). This procedure is processing performed in step S21 in FIG. 10 and step S31 in FIG. 11.

The CPU allocation limitation setting change number is determined based on the conversion ratio 1:α between the resource amount (specifically, the number of CPU cores) to be added or deleted and the CPU allocation limitation setting change number. For example, the conversion ratio α can be set as a predetermined fixed value (constant); for example, "α=1". In the following description, however, an example of calculating the CPU allocation limitation setting change number with the conversion ratio α being a variable will be described.

Figure 12:
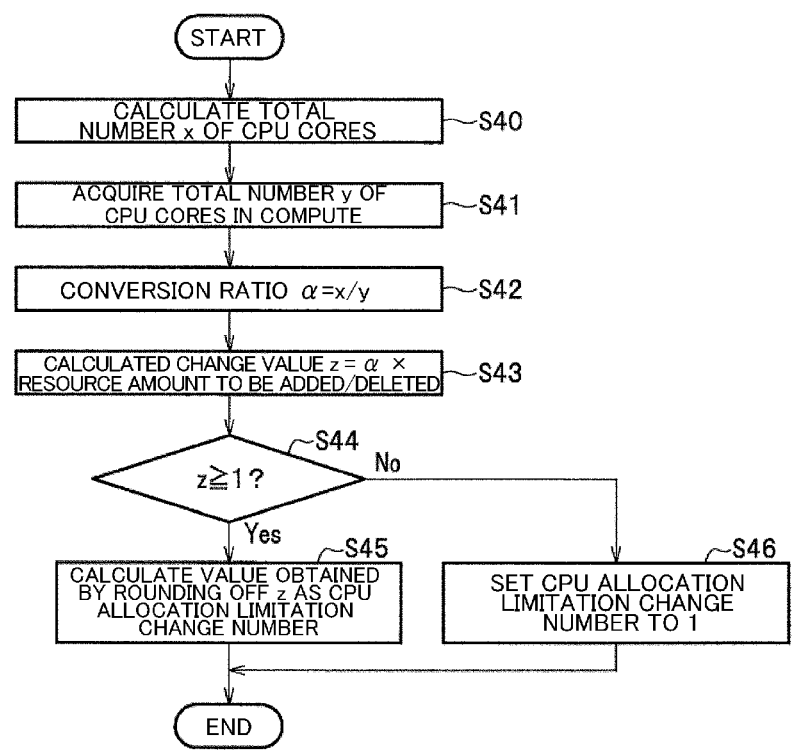
FIG. 12 is a flowchart showing a flow of processing for changing CPU allocation limitation setting executed by the virtualization infrastructure control device according to the present embodiment.

FIG. 12 is a flowchart showing a flow of processing for changing the CPU allocation limitation setting executed by the virtualization infrastructure control device 10 according to the present embodiment.

The resource delivery control unit 12 (resource extraction selection unit 122) of the virtualization infrastructure control device 10 executes the following processing based on scaling instruction information (scale-up instruction or scale-down instruction) acquired from the scaling instruction unit 112.

The resource extraction selection unit 122 calculates a total number x of CPU cores allocated to vCPUs of each VM 20 arranged on the same compute 30 as the VM 20 to be scaled up or scaled down indicated by the scaling instruction information (step S40).

Next, the resource extraction selection unit 122 acquires a total number y of CPU cores included in the compute 30 on which the VM 20 to be scaled up or scaled down is installed by, for example, referencing the resource management table 141 (FIG. 4) via the resource management unit 121 (step S41). Note that, if VMs 20 that are allocation destination are stored compute-by-compute in the resource management table 141 as shown in FIG. 5, the resource extraction selection unit 122 may acquire information indicating the total number y of CPU cores included in the compute 30 by checking a statement of the number of cores indicated by "/proc/cpuinfo".

Subsequently, the resource extraction selection unit 122 divides the total number x by the total number y of CPU cores included in the compute 30 to calculate the conversion ratio α (step S42).

Next, the resource extraction selection unit 122 multiplies the conversion ratio α by the resource amount (here, the number of CPU cores) to be added or deleted that is indicated by the scaling instruction information (scale-up instruction or scale-down instruction) to obtain a calculated change value z (step S43).

Then, the resource extraction selection unit 122 determines whether or not the calculated change value z is 1 or more (step S44).

Here, if the calculated change value z is 1 or more (step S44→Yes), the resource extraction selection unit 122 proceeds to step S45, calculates a value obtained by rounding off the calculated change value z as the CPU allocation limitation setting change number, and ends the processing.

On the other hand, if the calculated change value z is not 1 or more (step S44→No), the resource extraction selection unit 122 proceeds to step S46, sets the CPU allocation limitation setting change number to 1, and ends the processing.

A specific example of this processing for changing the CPU allocation limitation setting will be described. It is assumed here that two VMs 20, which are the VM #01 and the VM #02, are installed on the compute 30, the total number y of CPU cores included in the compute 30 is "8", the number of CPU cores allocated to vCPUs of each of the VM #01 and the VM #02 is "2", and the resource amount (the number of CPU cores) to be added indicated by the scaling instruction information (scale-up instruction) is "2".

In this case, in step S40, the resource extraction selection unit 122 calculates the total number x=2+2=4 as the total number x of the CPU cores of the VMs 20 (VM #01, VM #02) arranged on the same compute 30.

Then, in step S41, the resource extraction selection unit 122 acquires the total number y of CPU cores=8 as the total number y of CPU cores included in the compute 30 on which the VM 20 to be scaled up is installed.

Next, in step S42, the resource extraction selection unit 122 calculates α=x/y=4/8=0.5 as the conversion ratio α.

Subsequently, in step S43, the resource extraction selection unit 122 calculates z=conversion ratio α×the resource amount to be added=0.5×2=1, as the calculated change value z.

Then, in step S44, the resource extraction selection unit 122 determines whether or not the calculated change value z is 1 or more, and determines that the calculated change value z (here, "1") is 1 or more (step S44→Yes). Subsequently, in step S45, the resource extraction selection unit 122 rounds off the calculated change value z ("1"), calculates the CPU allocation limiting setting change number as being "1", and ends the processing.

Thus, the resource extraction selection unit 122 can convert the number of CPU cores indicated by the resource amount to be added or deleted to the change number in the CPU allocation limitation setting (CPU allocation limitation setting change number).

As described above, the virtualization infrastructure control device 10, the virtualization infrastructure control method, and the virtualization infrastructure control program according to the present embodiment can realize scale-up/scale-down of CPU resources on a virtualization infrastructure without changing the resource amount (the number of vCPUs) visible from the application side, that is, without affecting the application.

Note that the above-described virtualization infrastructure control device 10 can cause a computer to be operated by a program (virtualization infrastructure control program) for realizing the above-described functions. This program (virtualization infrastructure control program) can be distributed in the form of a program recorded in a recording medium, or can be distributed via a communication line.

REFERENCE SIGNS LIST

1 Virtualization infrastructure control system
5 Network
10 Virtualization infrastructure control device
11 Scaling control unit
12 Resource delivery control unit
13 Monitoring unit
14 Storage unit
20 VM (virtual machine)
30 Compute
31 Virtual machine setting file
32 Virtualization layer
111 Scaling determination unit
112 Scaling instruction unit
121 Resource management unit
122 Resource extraction selection unit
123 Virtual machine control unit
131 Resource monitoring unit
140 Resource information repository
141 Resource management table (resource management information)
145 Virtual machine image repository

The invention claimed is:

1. A virtualization infrastructure control device comprising:
a monitoring unit, including one or more processors, configured to monitor a load of a resource that is executed by a VM (Virtual Machine) installed on a computer, and acquire the monitored load as load information;
a scaling control unit, including one or more processors, configured to determine, based on the load information, whether or not to perform scaling to execute a resource allocation change, regard a resource allocated VM-by-VM, and calculate a resource amount required for the scaling if it is determined to perform the scaling of the VM; and
a resource delivery control unit, including one or more processors, configured to convert the resource amount required for the scaling to a change number for the number of allocated CPUs regarding a CPU core that is the resource allocated VM-by-VM, select the change number of CPU cores that are to be subjected to the scaling, and transmit, to the computer, resource change instruction information including information regarding the selected CPU cores whose allocation is to be changed.

2. The virtualization infrastructure control device according to claim 1, wherein when determining whether or not to perform the scaling of the VM, if the load information exceeds a predetermined first threshold, the scaling control unit is configured to determine to execute scale-up, and if the load information falls below a predetermined second threshold, the scaling control unit is configured to determine to execute scale-down.

3. The virtualization infrastructure control device according to claim 1, wherein a ratio of the change number for the number of allocated CPUs to the resource amount required for the scaling is stored as a predetermined conversion ratio in a storage medium, and the resource delivery control unit is configured to calculate the change number for the number of allocated CPUs with respect to the resource amount required for the scaling, based on the predetermined conversion ratio.

4. The virtualization infrastructure control device according to claim 1, wherein the resource delivery control unit is configured to use, as a conversion ratio, a value obtained by dividing a total number of CPU cores allocated to each VM installed on the same computer of the VM that is to be subjected to the scaling by a total number of CPU cores included in the computer, and calculate the change number for the number of allocated CPUs using the conversion ratio and the resource amount required for the scaling.

5. A virtualization infrastructure control method for a virtualization infrastructure control device that executes a change in allocation of a resource to a VM installed on a computer, wherein the virtualization infrastructure control device executes:
monitoring a load of a resource that is executed by the VM and acquiring the monitored load as load information;
determining, based on the load information, whether or not to perform scaling to execute a resource allocation change, regarding a resource allocated VM-by-VM, and calculating a resource amount required for the scaling if it is determined to perform the scaling of the VM; and
converting the resource amount required for the scaling to a change number for the number of allocated CPUs regarding a CPU core that is the resource allocated VM-by-VM, selecting the change number of CPU cores that are to be subjected to the scaling, and transmitting, to the compute, resource change instruction information including information regarding the selected CPU cores whose allocation is to be changed.

6. A non-transitory computer readable medium storing one or more instructions for causing a computer to function as an virtualization infrastructure control device and execute:
monitoring a load of a resource that is executed by a VM and acquiring the monitored load as load information;
determining, based on the load information, whether or not to perform scaling to execute a resource allocation change, regarding a resource allocated VM-by-VM, and calculating a resource amount required for the scaling if it is determined to perform the scaling of the VM; and
converting the resource amount required for the scaling to a change number for the number of allocated CPUs regarding a CPU core that is the resource allocated VM-by-VM, selecting the change number of CPU cores that are to be subjected to the scaling, and transmitting, to the compute, resource change instruction information including information regarding the selected CPU cores whose allocation is to be changed.

7. The virtualization infrastructure control method according to claim 5, wherein determining whether or not to perform the scaling of the VM comprises:
if the load information exceeds a predetermined first threshold, determining to execute scale-up, and if the load information falls below a predetermined second threshold, determining to execute scale-down.

8. The virtualization infrastructure control method according to claim 5, wherein a ratio of the change number for the number of allocated CPUs to the resource amount required for the scaling is stored as a predetermined conversion ratio in a storage medium, and
the method further comprises:
calculating the change number for the number of allocated CPUs with respect to the resource amount required for the scaling, based on the predetermined conversion ratio.

9. The virtualization infrastructure control method according to claim 5, further comprising:

using, as a conversion ratio, a value obtained by dividing a total number of CPU cores allocated to each VM installed on the same computer of the VM that is to be subjected to the scaling by a total number of CPU cores included in the computer; and calculating the change number for the number of allocated CPUs using the conversion ratio and the resource amount required for the scaling.

10. The non-transitory computer readable medium according to claim 6, wherein determining whether or not to perform the scaling of the VM comprises:

if the load information exceeds a predetermined first threshold, determining to execute scale-up, and if the load information falls below a predetermined second threshold, determining to execute scale-down.

11. The non-transitory computer readable medium according to claim 6, wherein a ratio of the change number for the number of allocated CPUs to the resource amount required for the scaling is stored as a predetermined conversion ratio in a storage medium, and one or more instructions further cause the computer to execute:

calculating the change number for the number of allocated CPUs with respect to the resource amount required for the scaling, based on the predetermined conversion ratio.

12. The non-transitory computer readable medium according to claim 6, wherein one or more instructions further cause the computer to execute:

using, as a conversion ratio, a value obtained by dividing a total number of CPU cores allocated to each VM installed on the same computer of the VM that is to be subjected to the scaling by a total number of CPU cores included in the computer; and calculating the change number for the number of allocated CPUs using the conversion ratio and the resource amount required for the scaling.

* * * * *